United States Patent Office 3,686,200
Patented Aug. 22, 1972

3,686,200
PHOSPHORIC ACID ESTERS
Otto Scherer, Bad Soden, Taunus, and Hilmar Mildenberger, Kelkheim, Taunus, Germany, assignors to Farbwerke Hoechst Aktiengesellschaft vormals Meister Lucius & Brüning, Frankfurt am Main, Germany
No Drawing. Filed May 28, 1968, Ser. No. 732,544
Claims priority, application Germany, June 3, 1967,
F 52,591, F 52,593
Int. Cl. C07f 9/08, 9/16
U.S. Cl. 260—308 R                    7 Claims

ABSTRACT OF THE DISCLOSURE

Novel phosphoric acid esters of the general formula

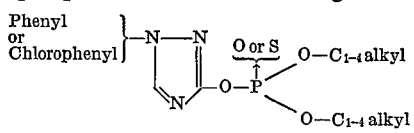

The novel compounds are useful for the control of pests on cultured plants and animals.

---

The present invention relates to new phosphoric acid esters, a process for their manufacture and their use as insecticides and pesticides.

German Pat. No. 910,652 and corresponding British Pat. No. 713,278 disclose phosphoric acid esters that contain an enolizable heterocycle, which esters can be used for the control of pests.

The present invention provides phosphoric acid esters of the general Formula 1

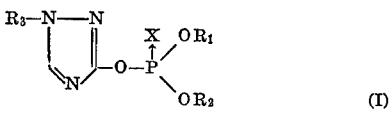

in which $R_1$ and $R_2$ each represents an alkyl radical having 1 to 4 carbon atoms, preferably the ethyl radical; $R_3$ represents a phenyl radical or phenyl radicals substituted by chlorine atoms, and X represents an oxygen atom or a sulfur atom.

The present invention also relates to a process for the manufacture of phosphoric acid esters of the general Formula I, which comprises reacting phosphoric acid halides of the general Formula II

in which X, $R_1$ and $R_2$ have the meanings given above and Hal represents a halogen atom, preferably a chlorine atom, with 3-hydroxy-triazoles substituted by $R_3$ according to the above formula, or the metal salts of the 3-hydroxy-triazoles, preferably the sodium- or potassium salts thereof.

In the first instant, the reaction is carried out in the presence of acid-binding agents such as alkali metal carbonates, for example sodium carbonate, alkaline earth metal carbonates, or tertiary amines, for example triethyl amine, dimethyl aniline or pyridine.

The reaction is illustrated by the following scheme:

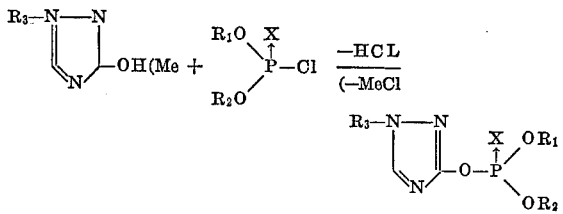

The reaction may be carried out with or without using solvents. As solvents there are suitable all usual organic liquids which are inert under the reaction conditions, for example acetone, methylethyl ketone, acetonitrile, acetic acid ethyl ester, butyl acetate, tetrahydrofurane, dioxane, methylene chloride, carbon tetrachloride, benzene, xylene, chlorobenzene and the like.

The reaction is generally effected at a temperature in the range of from about 20–25° C. to the boiling points of the individual solvents, preferably from 50 to 90° C. An addition of copper powder in an amount of from 1 to 20 mol percent may have a favorable effect on the reaction velocity.

Some of the novel compounds are obtained as oils, some as crystals. They cannot be distilled without decomposition.

Further the present invention provides insecticidal compositions comprising as the active ingredient a phosphoric acid ester of the general Formula I. These novel phosphoric acid esters exhibit an excellent pesticidal activity, especially insecticidal activity by penetrating into the tissue of the plants, for example, they are effective as contact and stomach poisons, especially against herbivorous and plant-sucking arthropodes. Owing to their low toxicity to warm blooded animals, the phosphoric acid esters of the Formula I are, moreover, suitable for the control of ecto- and endo-parasites on and in animals. In contradistinction to known compounds of a similar constitution, the phosphoric acid esters I are effective against arthropodes that are resistant to known phosphoric acid esters. The phosphoric acid esters I are also superior to known compounds with respect to the duration of their activity.

The phosphoric acid esters I are far superior to 3-(O,O-dimethyl - thionophosphoryl) - 5 - ethyl - 1,2,4 - triazole disclosed in German Pat. No. 910,652, Example 19, as well as to the corresponding undisclosed 3 - (O,O - diethyl-thionophosphoryl) - 5 - ethyl - 1,2,4 - triazole with respect to their biological activity, as is shown in the following Examples 6 to 9. The phosphoric acid esters I are well compatible with plants and possess fungicidal properties in addition to their insecticidal and parasiticidal actions. Therefore, they can be used for protecting plants and stocks as well as for combatting parasites on and in animals.

In order to obtain pesticidal compositions, the phosphoric acid esters I may be mixed with inert solid or liquid carrier materials, with adhesives, wetting agents, dispersing agents and grinding auxiliaries to be used as wettable powders, emulsions, suspensions, dusting powders, granules, fly-catchers, strewing powders and detergents. Such compositions may also be combined with other insecticides, fungicides, nematocides and herbicides.

As inert carrier materials, there may be used mineral substances such as aluminium silicates, alumina, kaolin, chalks, siliceous chalks, talcum, kieselguhr, or hydrated silicic acids or preparations of these mineral substances with special additives, for example chalk greased with sodium stearate. As inert carrier materials for liquid preparations there may be used all the usual and suitable inert organic solvents, for example toluene, xylene, diacetone alcohol, cyclohexanone, isophorone, gasolines, paraffin oils, dioxane, dimethyl formamide, dimethyl sulfoxide, ethyl acetate, butyl acetate, tetrahydrofurane, chlorobenzene and the like.

As adhesives there may be used glutinous cellulose products or polyvinyl alcohols.

As wetting agents there may be used all suitable emulsifiers, such as hydroxy-ethylated alkylphenols, salts of aryl- or alkyl-aryl sulfonic acids, salts of methyl-taurine, salts of phenylcogasine sulfonic acids or soaps.

As dispersing agents there may be used salts of dried cellulose sulfite liquors, e.g. potassium ligninsulfonate, salts of naphthalene-sulfonic acid and, if required, hydrated silicic acids or even kieselguhr.

As grinding auxiliaries there may be used suitable inorganic or organic salts of sodium sulfate, ammonium sulfate, sodium carbonate, sodium bicarbonate, sodium thiosulfate, sodium stearate, sodium acetate.

Insecticidal compositions obtained according to the invention may preferably be used in the form of an emulsion concentrate containing from 10 to 70% by weight of a phosphoric acid ester I and from 5 to 20% by weight of a wetting agent, whereas the rest making up 100% by weight, is a suitable organic solvent.

For the so-called ultra-low-volume method by which highly concentrated mixtures are sprayed through valves from planes, there may be used insecticidal compositions containing from 70 to 90% by weight of a phosphoric acid ester I and from 30 to 10% by weight of an aromatic and/or aliphatic mineral oil, having a boiling point higher than 120° C.

The following examples serve to illustrate the present invention, but they are not intended to limit it thereto.

EXAMPLE 1

32.2 grams (0.2 mol) of 1-phenyl-3-hydroxy-1,2,4-triazole were suspended in 250 milliliters of acetone and 38 grams (0.2 mol) of O,O-diethyl-thiophosphoryl chloride were added thereto. Subsequently, 22 grams (0.22 mol) of triethylamine were added dropwise and the mixture was stirred for 6 hours at about 50° C. After cooling, the triethylamine hydrochloride was filtered off and the solvent was evaporated from the filtrate. There were obtained 60 grams of 1-phenyl-3-(O,O-diethylthionophosphoryl)-1,2,4-triazole as a light-brown oil.

Calculated for $C_{12}H_{16}N_3O_3PS$ (percent): N, 13.5; P, 9.9. Found (percent): N, 12.5; P, 9.9. Molecular weight: 313.

EXAMPLE 2

36.6 grams (0.2 mol) of the sodium salt of 1-phenyl-3-hydroxy-1,2,4-triazole were suspended in 200 milliliters of acetonitrile and 32.2 grams (0.2 mol) of O,O-dimethyl-thiophosphoric acid chloride were added thereto. After the suspension had been stirred for 12 hours at 50-60° C. the sodium chloride was filtered off and the solvent was evaporated from the filtrate. Thus, 55 grams of 1-phenyl - 3 - (O,O-dimethyl-thionophosphoryl) - 1,2,4-triazole were obtained.

Calculated for $C_{10}H_{12}N_3O_3PS$ (percent): N, 14.75; P, 10.85. Found (percent): N 14.2; P 10.8. Molecular weight: 285.

EXAMPLE 3

400 milliliters of tetrahydrofurane and 69 grams (0.4 mol) of O,O-diethyl-phosphoric acid chloride were added to 64.4 grams (0.4 mol) of 1-phenyl-3-hydroxy-1,2,4-triazole. 44 grams (0.44 mol) of triethylamine were added dropwise to the mixture. For completing the exothermic reaction, stirring was continued for 3 hours at 50° C. Then the triethylaminehydrochloride was filtered off. The filtrate was evaporated, the residue was dissolved in benzene and washed with water. After evaporating the benzene, there were obtained 117 grams of 1-phenyl-3-(O,O-diethyl-phosphoryl)-1,2,4-triazole as a light-brown oil.

Calculated for $C_{12}H_{16}N_3O_4P$ (percent): N, 14.1; P, 10.4. Found (percent): N, 13.9; P, 10.0. Molecular weight: 297.

EXAMPLE 4

A mixture of 25 grams (0.127 mol) of 1-(3-chlorophenyl)-3-hydroxy-1,2,4-triazole, 24 grams (0.127 mol) of O,O-diethylthiophosphoryl chloride, 15 grams (0.15 mol) of triethylamine and 250 milliliters of benzene were stirred for 10 hours at 60° C. After filtration, the residue was washed with water and the benzene was evaporated. There were obtained 39 grams of 1-(3-chlorophenyl)-3-(O,O-diethyl-thionophosphoryl)-1,2,4-triazole.

Calculated for $C_{12}H_{15}Cl\ N_3O_3PS$ (percent): N, 12.1; P, 8.9. Found (percent): N, 12.1; P, 8.7. Molecular weight: 347.5.

EXAMPLE 5

A suspension of 43.4 grams (0.2 mol) of the sodium salt of 1-(4-chlorophenyl)-3-hydroxy-1,2,4-triazole in 300 milliliters of benzene was refluxed with 38 grams (0.2 mol) of O,O-diethyl-thiophosphoryl chloride. The sodium chloride was filtered off and the benzene was evaporated.

The yield obtained was 64 grams of 1-(4-chlorophenyl)-3-(O,O-diethyl-thionophosphoryl)-1,2,4-triazole as a yellow oil Calculated for $C_{12}H_{15}ClN_3O_3PS$ (percent): N, 12.1; P, 8.9. Found (percent): N, 12.0; P, 8.9. Molecular weight: 347.5.

EXAMPLES 6 TO 9

The following tables show the actions of the active ingredients according to the invention on a considerable number of pests. The active ingredients of the invention are designated hereinafter as follows:

1-phenyl-3-(O,O-diethyl-thiono-phosphoryl)-1,2,4-triazole as AI 1;
1-phenyl-3-(O,O-diethyl-phosphoryl)-1,2,4-triazole as AI 2;
1-(3-chlorophenyl)-3-(O,O-diethyl-thionophosphoryl)-1,2,4-triazole as AI 3;
1-(4-chlorophenyl)-3-(O,O-diethyl-thionophosphoryl)-1,2,4-triazole as AI 4.

The comparative substances are designated hereinafter as follows:

3-(O,O-dimethyl-thionophosphoryl)-5-ethyl-1,2,4-triazole (known from German Pat. No. 910,652) as comp. I;
3-(O,O-diethyl-thionophosphoryl)-5-ethyl-1,2,4-triazole as comp. II;
O,O-diethyl-S-2.5-(dichloro-phenyl-thiomethyl)-dithiophosphate (known from German Pat. No. 957,213) as comp. III;
O,O-dimethyl-S-2-(ethyl-mercapto)-ethyl-thiolphosphate (known from German Pat. No. 836,349) as comp. IV;
O,O-dimethyl-1-(hydroxy-2,2,2-trichloroethyl)-phosphonate (known from Chem. Abstr. 50, 9673 (1956)) as comp. V.

The symbol $\phi$ indicated in the tables means that the respective substance showed no activity at the tested concentration.

EXAMPLE 6

Tables 1, 2a and 2b show examples for the use and the actvity of different compositions applied by different methods.

Table 1 shows the effects of the active ingredients of the invention and that of comparative substances I and II on a series of arthropodes. The insects were either dusted directly with the active ingredient or sprayed with a solution thereof, or the substrates on which the insects were found were treated with a solution of the active ingredient; in further tests, both the insects and the forage were sprayed with a solution of the active ingredient and in a final test only the forage was treated.

Table 2a shows the effects on different pests with different concentrations of the active ingredients and of the comparative substances.

Table 2b shows the activity against a stock of spinning mites (metatetranychus ulmi Dardar) which is resistant to phosphoric acid esters.

According to the above tables, the active ingredients of the invention are superior to the comparative substances.

EXAMPLE 7

The data given in Table 3 were determined by applying the active ingredients per os using a micro-applicator manufactured by Messrs. Makers Burkhard Mfg. Co. Ltd., Rickmansworth, England. The amounts of the active ingredients and comparative substances indicated were administered to insects in a solution with acetone. The active ingredients of the invention are superior to the comparative substances.

EXAMPLE 8

In order to examine the prolonged activity of the active ingredients of the invention in comparison with known substances, common house-flies, some of them normal, some resistant to phosphoric acid esters, were treated at 20–22° C. on dead materials, for example glass, wood, cotton fabric, polyvinyl chloride sheets, with active ingredients of the invention and with the comparative substance V. For this purpose, 1 milliliter each of a solution having the given concentration (0.1% by weight) was spread onto 65 cm.² of surface of the dead material.

Table 4a shows that a layer of active ingredients of the invention on dead material preserved its activity both against the normal house-flies (musca domestica) and the house-flies that were resistant to phosphoric acid esters, over a prolonged period of time. The effective time (TL 100), i.e. the time required for completely (100%) killing the house-flies, was increased only slightly. In contrast thereto, the effective time was essentially prolonged with the known comparative substance V. In this latter case, the activity was, moreover, already neutralized after 40 days whereas in the active ingredients of the invention it was still perfectly the same as at the beginning. The known comparative substances I and II were not considered in this test since, according to Table 1, they have an only weak activity against house-flies.

EXAMPLE 9

As a model for flies, such as Glossina, living in the bushes, a test was carried out with house-flies on citrus plants as a sclerophyllous plant. Table 4b shows that the prolonged activity of the active ingredients of the invention against normally sensitive house-flies on leaves of citrus trees was substantially superior to the activity of the comparative substance V; the time required for a 100%-killing of the flies was only slightly increased with the active ingredients of the invention. The activity of the comparative substance V was neutralized after 51 days whereas the activity of the active ingredients of the invention was still perfectly the same as at the beginning.

TABLE 1

[Treatment of insects and substrates or forage. The numbers show the percentage of active ingredients at which 100% of the arthropodes cited were killed]

| | Dusting powder tests [1] | | | Spray tests | | | | | | | | Treatment of forage, carpocapsa pomonella |
|---|---|---|---|---|---|---|---|---|---|---|---|---|
| | | | | Musca domestica, treatment of— | | Treatment of substrate [3] | | | Treatment of insects and forage | | | |
| | Periplaneta americ. | Blatta orient. | Blattella germ. | Substrate [2] | Insects and substrate | Cimex lect. | Ornithodor moubata | Dermanyssus gall. | Epilachna variv. | Pachytilus migrat. | Prodenia litura | |
| AI 1 | 0.5 | 0.025 | 0.025 | 0.0025 | 0.05 | 0.012 | 0.025 | 0.0002 | 0.005 | 0.05 | 0.005 | 0.05 |
| AI 2 | >0.05 | >0.05 | 0.012 | 0.0025 | 0.008 | 0.006 | 0.0025 | 0.00015 | 0.01 | 0.01 | 0.05 | 0.1 |
| AI 3 | 0.1 | 0.05 | 0.025 | 0.0025 | 0.05 | 0.006 | 0.025 | 0.0005 | 0.005 | 0.02 | 0.01 | 0.1 |
| AI 4 | 0.05 | 0.025 | 0.012 | 0.0025 | 0.05 | 0.012 | >0.05 | 0.00025 | 0.005 | 0.05 | 0.01 | >0.05 |
| Comp. II | | | | 0.1 | 1.0 | 0.1 | 0.1 | 0.001 | | | | |
| Comp. I | | | | 0.1 | 1.0 | 0.1 | 0.1 | 0.001 | | | | |

[1] Gram of active ingredient per square meter.
[2] Test on glass substrate (Petri dishes) 1 cc. of solution having the active ingredient content given was spread on 65 cm.² of substrate.
[3] 2 cc. of solution having the active ingredient content given were sprayed per cubic meter.

TABLE 2a

| | The active ingredients were sprayed on: | | | | | | | |
|---|---|---|---|---|---|---|---|---|
| | Doralis fabae, Myzodes persicae on Vicia faba or Cinneraria | | Pseudococcus citri on citrus trees | | Oncopeltus fasciatus, then put on untreated plants | | Doralis fabae on underside of leaf while only upperside of leaf treated: penetration activity | |
| | Percent concentration in spraying the mixture | Percent killing | Percent concentration in spraying the mixture | Percent killing | Percent concentration in spraying the mixture | Percent killing | Percent concentration in spraying the mixture | Percent killing |
| AI 1 | 0.003 | 100 | 0.025 | 100 | 0.0125 | 100 | 0.025 | 100 |
| AI 2 | 0.006 | 100 | 0.05 | 95 | 0.0125 | 100 | | |
| AI 3 | 0.006 | 100 | 0.1 | 95 | 0.0125 | 100 | 0.05 | 100 |
| AI 4 | 0.0125 | 100 | 0.05 | 95 | 0.0125 | 100 | | |
| Comp. II | 0.05 | 50 | 0.1 | 40 | 0.1 | φ | 0.1 | φ |
| Comp. I | 0.05 | φ | 0.1 | φ | 0.1 | φ | 0.1 | φ |

TABLE 2b

Spraying of Metatetranychus ulmi Dardar (resistant to phosphoric acid esters) on apple trees planted in pots—

| | Percent concentration in spraying mixture | Degree of activity in percent (Abbott) | Ovicidal activity estimated in percent |
|---|---|---|---|
| AI 1 | 0.05 | 100 | 100 |
| | 0.025 | 100 | 85–90 |
| | 0.0125 | 96 | 70 |
| | 0.006 | 88 | 30 |
| Comp. I | 0.1 | φ | φ |
| Comp. II | 0.1 | φ | φ |
| Comp. III | 0.06 | 40 | φ |
| | 0.04 | φ | φ |
| Comp. IV | 0.02 | φ | φ |
| | 0.05 | φ | φ |

TABLE 3

[Test by oral administration. Concentration of active-ingredient in milligram per kilogram of animal species/mortality in percent]

| | Musca domestica | Onithodorus moubata |
|---|---|---|
| AI 1 | 6.0/100 | 60/100 |
| AI 2 | 6.0/100 | 60/100 |
| AI 4 | 66/100 | 100/40 |
| Comp. II | 50/10 | 200/0 |
| Comp. I | 50/10 | 200/40 |

TABLE 4a

[Tests as to prolonged activity against normal house-flies and house-flies resistant to phosphoric acid esters, on materials such as glass, wood, cotton fabrics, polyvinyl chloride sheets, at 20-22° C. 1 milliliter of the solution having the given concentration, was spread on 65 cm.²]

| Stock of flies | | Concentration,[1] percent | 100%-killing (DL 100) in minutes after an action of— | | | | | | | | |
|---|---|---|---|---|---|---|---|---|---|---|---|
| | | | 0 day | 1 day | 5 days | 12 days | 21 days | 28 days | 40 days | 62 days | 94 days |
| AI 1 | Normal | 0.1 | 30 | 45 | 45 | 60 | 60 | 60 | 60 | 60 | 90 |
| | Resistant | 0.1 | 45 | 90 | 90 | 70 | 60 | 60 | 60 | 60 | 120 |
| AI 2 | Normal | 0.1 | 30 | 45 | 45 | 90 | 90 | 80 | 90 | 80 | 90 |
| | Resistant | 0.1 | 30 | 60 | 80 | 90 | 90 | 90 | 90 | 90 | 120 |
| Comp. V | Normal | 0.1 | 60 | 120 | 120 | 150 | 150 | 180 | 180 | | |
| | Resistant | 0.1 | 60 | 120 | 300 | 180 | 180 | 180 | 180 | | |

[1] Of active-ingredient in spraying mixture.

TABLE 4b

[Tests as to the prolonged activity against house-flies on citrus plants as model for flies, such as Glossina, living in the bushes. The plants were sprayed with the mixture until this mixture began to drop off from the leaves]

| | Active-ingredient-concentration in spraying mixture, percent | 100%-killing in minutes after an action of— | | | | | |
|---|---|---|---|---|---|---|---|
| | | 0 day | 4 days | 11 days | 24 days | 27 days | 51 days |
| AI 1 | 0.1 | 45 | 60 | 60 | 60 | 180 | 180 |
| AI 3 | 0.1 | 45 | 60 | 60 | 60 | 150 | 150 |
| Comp. V | 0.1 | 60 | 90 | 180 | 240 | 400 | |

We claim:

1. A compound of the Formula I

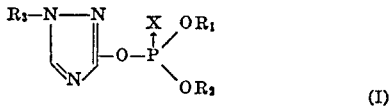

(I)

in which $R_1$ and $R_2$ each represents an alkyl radical having 1 to 4 carbon atoms, $R_3$ represents the phenyl radical or phenyl radicals substituted by chlorine atoms and X represents oxygen or sulfur.

2. A compound of the Formula I as claimed in claim 1, wherein $R_1$ and $R_2$ each represents an ethyl radical.

3. 1-phenyl-3 - (O,O-diethyl-thionophosphoryl) - 1,2,4-triazole.

4. 1-phenyl-3-(O,O-dimethyl-thionophosphoryl) - 1,2,4-triazole.

5. 1-phenyl-3-(O,O-diethyl-phosphoryl)-1,2,4-triazole.

6. 1-(3-chlorophenyl) - 3 - (O,O-diethyl-thionophosphoryl)-1,2,4-triazole.

7. 1-(4 - chlorophenyl) - 3 - (O,O-diethyl-thionophosphoryl)-1,2,4-triazole.

References Cited

FOREIGN PATENTS 713,278    8/1954    Great Britain _____ 260—308

ALTON D. ROLLINS, Primary Examiner

U.S. Cl. X.R.

260—308 C; 424—200